United States Patent
Fu (10) Patent No.: US 12,189,235 B2
(45) Date of Patent: Jan. 7, 2025

(54) QUANTUM DOT LENS AND BACKLIGHT MODULE

(71) Applicant: HUIZHOU CHINA STAR OPTOELECTRONICS DISPLAY CO., LT, Guangdong (CN)

(72) Inventor: Linlin Fu, Guangdong (CN)

(73) Assignee: HUIZHOU CHINA STAR OPTOELECTRONICS DISPLAY CO., LTD., Guangdong (CN)

( * ) Notice: Subject to any disclaimer, the term of this patent is extended or adjusted under 35 U.S.C. 154(b) by 179 days.

(21) Appl. No.: 17/298,631

(22) PCT Filed: Apr. 25, 2021

(86) PCT No.: PCT/CN2021/089663
§ 371 (c)(1),
(2) Date: Dec. 14, 2023

(87) PCT Pub. No.: WO2022/217645
PCT Pub. Date: Oct. 20, 2022

(65) Prior Publication Data
US 2024/0103318 A1 Mar. 28, 2024

(30) Foreign Application Priority Data
Apr. 12, 2021 (CN) .................. 202110390156.5

(51) Int. Cl.
*G02F 1/00* (2006.01)
*G02B 3/12* (2006.01)
*G02F 1/1335* (2006.01)
*G02F 1/13357* (2006.01)

(52) U.S. Cl.
CPC ......... *G02F 1/133607* (2021.01); *G02B 3/12* (2013.01); *G02F 1/133603* (2013.01)

(58) Field of Classification Search
CPC ....................................... G02B 3/12
See application file for complete search history.

(56) References Cited

U.S. PATENT DOCUMENTS

| | | | |
|---|---|---|---|
| 2002/0034363 A1* | 3/2002 | Wickman | G02B 6/4249 385/52 |
| 2015/0311385 A1* | 10/2015 | Qiu | G02F 1/133606 438/26 |
| 2017/0067604 A1* | 3/2017 | Li | G02F 1/1336 |
| 2020/0033527 A1* | 1/2020 | Lee | G02F 1/133615 |

FOREIGN PATENT DOCUMENTS

| | | |
|---|---|---|
| CN | 103672732 A | 3/2014 |
| CN | 205404870 U | 7/2016 |
| CN | 107195763 A | 9/2017 |
| CN | 206497278 U | 9/2017 |

(Continued)

*Primary Examiner* — Gerald J Sufleta, II
(74) *Attorney, Agent, or Firm* — Rivka Friedman (57) ABSTRACT

A quantum dot lens and a backlight module are provided. The quantum dot lens includes a lens body and a quantum-dot homogeneous-sol material. Wherein, the lens body has a light incident surface and a light exiting surface. The light exiting surface has a groove. The quantum-dot homogeneous-sol material is filled in the groove. Embodiments of the present application allow luminous efficacy and power efficiency to be improved.

20 Claims, 5 Drawing Sheets

(56) References Cited

FOREIGN PATENT DOCUMENTS

| | | | |
|---|---|---|---|
| CN | 108321284 | A | 7/2018 |
| CN | 108538875 | A | 9/2018 |
| CN | 110346972 | A | 10/2019 |
| CN | 111081847 | A | 4/2020 |
| CN | 213581407 | U | 6/2021 |
| KR | 20120128543 | A | 11/2012 |

\* cited by examiner

QUANTUM DOT LENS AND BACKLIGHT MODULE

FIELD OF INVENTION

The present application relates to the field of backlights and specifically to a quantum dot lens and a backlight module.

DESCRIPTION OF PRIOR ART

There are many ways to realize high color gamuts for display devices by backlight design, and a basic principle is to narrow half peak widths of backlight spectrums to improve color purity, thereby improving the color gamuts. Solutions for realizing the high color gamuts mainly include integrating light emitting diode (LED) chips, fluorescent powders, or quantum dots (QDs) with different parts and materials. These parts and materials include, for example, QD films, QD tubes, QD-LEDs, etc. Wherein, using the QD films is a main solution for most liquid crystal displays (LCDs) with high color gamuts.

Figure 1:
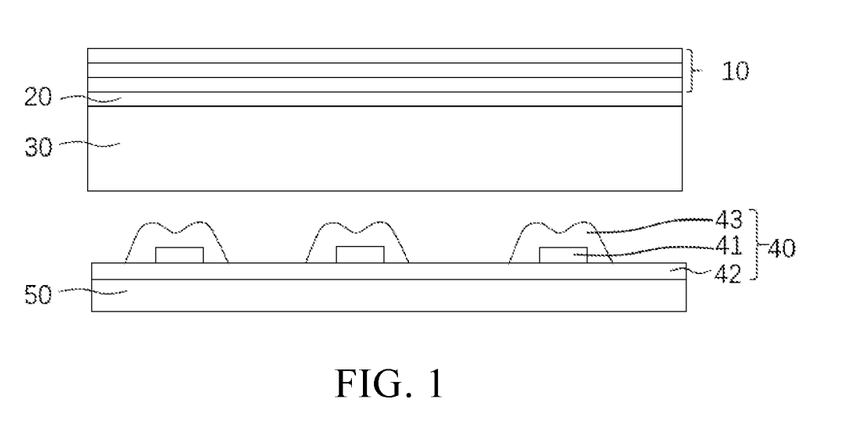
FIG. 1 is a structural schematic diagram of a direct-lit backlight module in prior art.
Figure 2:
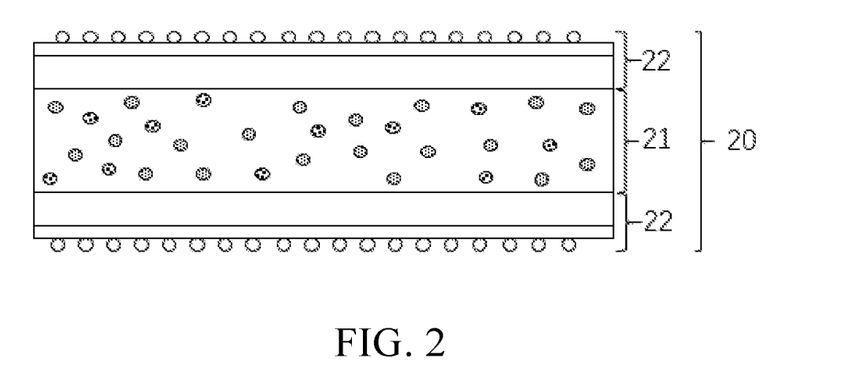
FIG. 2 is a structural schematic diagram of a quantum dot film in the backlight module illustrated in FIG. 1.

FIG. 1 is a schematic diagram of a QD film used in a structure of a direct-lit backlight module in prior art. The direct-lit backlight module includes an optical film 10, a quantum dot film 20, a diffusion plate 30, a LED bar 40, and a backplate 50. Wherein the LED bar 40 includes a light bar substrate 42, LED chips 41, and optical lenses 43. FIG. 2 is a schematic diagram of a film layer structure of the quantum dot film 20 in the prior art. The quantum dot film 20 includes a quantum dot layer 21 and barrier layers 22 respectively disposed on two sides of the quantum dot layer 21.

Due to quantum dot materials characteristics and film production characteristics, the quantum dot film 20 has following problems when LCDs of high color gamuts are realized.

Figure 3:
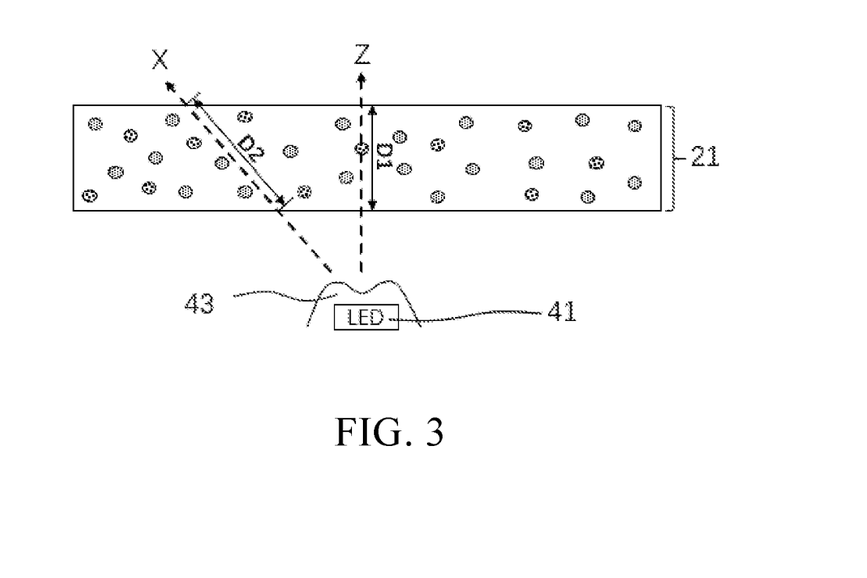
FIG. 3 is a schematic diagram of a principle of appearance of a yellow-ring phenomenon in the backlight module illustrated in FIG. 1.
Figure 4:
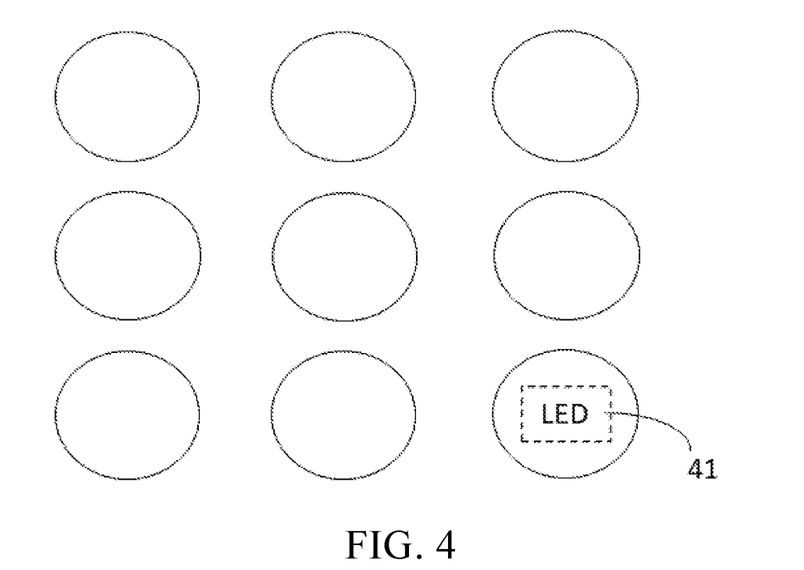
FIG. 4 is a schematic diagram of an effect of the appearance of the yellow-ring phenomenon in the backlight module illustrated in FIG. 1.

1. An ineffective region will appear on an edge of the quantum dot film 20 due to poor cutting, long-term use, or being in high temperature and high humidity environments, i.e., at an edge of the quantum dot film 20, because the barrier layer 22 cannot effectively isolate water and oxygen, resulting in QD particles failing and behaving in a way in which the edge can no longer emit red and green lights through excitation of blue light, but directly forms a blue edge through the blue light, i.e., the edge ineffective region. When it is used in products with narrow bezels, presence of the ineffective region can directly cause displayed images of LCDs to be poor. In severe situations, viewers can directly see a blue tint phenomenon on four sides of TVs, which affects image quality.
2. A light shape of the LEDs is Lambertian type, of which light intensity at middle angles is strong, and light intensity at large angles is weak. As illustrated in FIG. 3, Z represents a light at front viewing angles, Y represents a light at large angles, D1 represents a light path of the light Z at front viewing angles passing through the quantum dot layer 21, and D2 represents a light path of the light Y at large viewing angles passing through the quantum dot layer 21. Wherein, a length of D1 is short, and excitement in D1 is less, while a length of D2 is long, and excitement in D2 is great. Therefore, a difference in lengths of the light paths causes a yellow-ring phenomenon (e.g., illustrated in FIG. 4), in which a middle region is blue-tinted, and an edge region is yellow-tinted, to appear at a position corresponding to the light Y at large angles compared to a position corresponding to the light Z at front viewing angels, which makes colors of the light uneven.
3. Limited by materials and production methods of the quantum dot film 20, after quantum dot materials are made into films, compared to quantum dot materials in a solution state, their luminous efficacy reduces by 20% or more, resulting in loss of brightness, which causes power consumption to increase.

SUMMARY OF INVENTION

Technical Problem

Embodiments of the present application provides a quantum dot lens and a backlight module, which can improve luminous efficacy and improves power efficiency.

Technical Solution

On a first aspect, one embodiment of the present application provides a quantum dot lens used to distribute light for a light source, including:
a lens body having a light incident surface and a light exiting surface, wherein the light exiting surface has a groove; and
a quantum-dot homogeneous-sol material,
wherein the lens body has a central axis, the groove and the lens body are arranged coaxially, a bottom wall of the groove recesses toward the light incident surface along the central axis of the lens body, a depth of the groove decreases radially from the central axis of the lens body to a periphery of the lens body, the quantum-dot homogeneous-sol material is filled in the groove, and the light source is a Lambertian light source.

Optionally, in some embodiments of the present application, the bottom wall of the groove recesses toward a direction facing away from a center facing of the light exiting surface; or
the bottom wall of the groove protrudes toward a center of the light exiting surface; or
the bottom wall of the groove is in an inverted conical shape or in an inverted pyramidal shape.

Optionally, in some embodiments of the present application, a plane where an opening of the groove is located is perpendicular to the central axis of the lens body.

Optionally, in some embodiments of the present application, the lens body is in a conical-frustum shape.

Optionally, in some embodiments of the present application, a central axis of the light source overlaps the central axis of the lens body.

Optionally, in some embodiments of the present application, the light source is light emitting diode (LED) chips.

Optionally, in some embodiments of the present application, the quantum dot lens further includes a cover body, and the cover body covers on an opening of the groove.

Optionally, in some embodiments of the present application, the cover body is sealedly connected to the lens body.

Optionally, in some embodiments of the present application, an interior of the groove is in a vacuum state.

On a second aspect, one embodiment of the present application provides a quantum dot lens used to distribute light for a light source, including:
a lens body having a light incident surface and a light exiting surface, wherein the light exiting surface has a groove; and
a quantum-dot homogeneous-sol material, a quantum-dot homogeneous-sol material, wherein the quantum-dot homogeneous-sol material is filled in the groove.

Optionally, in some embodiments of the present application, the lens body has a central axis, the groove and the lens body are arranged coaxially, a bottom wall of the groove recesses toward the light incident surface along the central axis of the lens body, a depth of the groove decreases radially from the central axis of the lens body to a periphery of the lens body.

Optionally, in some embodiments of the present application, the bottom wall of the groove recesses toward a direction facing away from a center of the light exiting surface; or
- the bottom wall of the groove protrudes toward a center of the light exiting surface; or
- the bottom wall of the groove is in an inverted conical shape or in an inverted pyramidal shape.

Optionally, in some embodiments of the present application, a plane where an opening of the groove is located is perpendicular to the central axis of the lens body.

Optionally, in some embodiments of the present application, a central axis of the light source overlaps the central axis of the lens body.

Optionally, in some embodiments of the present application, the lens body is in a conical-frustum shape.

Optionally, In some embodiments of the present application, the light source is a Lambertian light source.

Optionally, in some embodiments of the present application, the quantum dot lens further includes a cover body, and the cover body covers on an opening of the groove.

Optionally, in some embodiments of the present application, the cover body is sealedly connected to the lens body.

Optionally, in some embodiments of the present application, an interior of the groove is in a vacuum state.

On a third aspect, the present application provides a backlight module, including at least one of any aforesaid quantum dot lens and at least one light source. Wherein each of the light source is provided with one of the quantum dot lens, and the light incident surface of the quantum dot lens faces toward the light source.

Advantageous Effect

Compared to entire quantum dot films generally used in the prior art, in embodiments of the present application, the quantum-dot homogeneous-sol material is filled in the groove of the light exiting surface of the lens body, which allows to improve luminous efficacy and power efficiency of the quantum dot material, and reduction of luminous efficacy of the quantum dot material incurred by film forming processes is prevented. Furthermore, consumption of the quantum dot material can be reduced, eliminating production and assembling processes of the quantum dot films. In addition, in the embodiments of the present application, by making the bottom wall of the groove recess toward the light incident surface along the central axis of the lens body and by making the depth of the groove decrease radially from the central axis of the lens body to the periphery of the lens body, the light path difference between the light at front viewing angles and the light at large angles can be reduced, thereby improving the problem of uneven color of emitted light incurred by the yellow-ring phenomenon.

DETAILED DESCRIPTION OF EMBODIMENTS

Embodiments of the present application provide a quantum dot lens and a backlight module. The details are described below respectively. It should be noted that a description order of the following embodiments is not intended to limit a preferred order of the embodiments.

As illustrated in FIG. 5 to FIG. 11, one embodiment of the present application provides a quantum dot lens used to distribute light for a light source 500. The quantum dot lens includes a lens body 100 and a quantum-dot homogeneous-sol material 200. The quantum dot lens allows light-emitting viewing angles of the light source 500 to be increased, thereby realizing thinness, reducing a number of the light source 500, and reducing cost.

Figure 5:
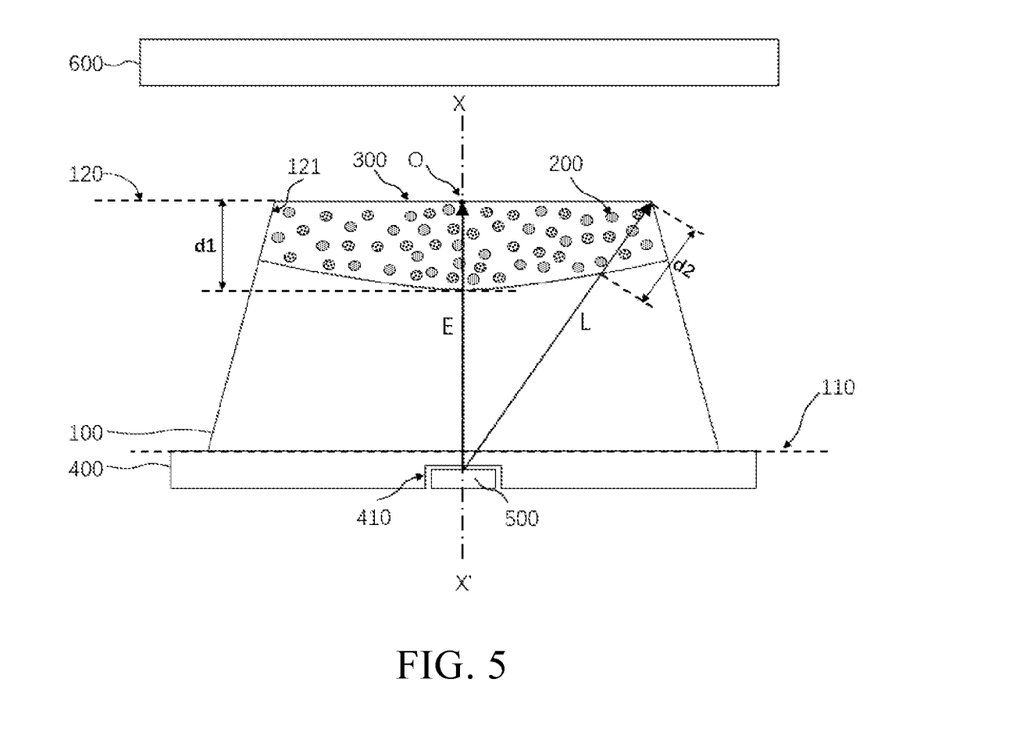
FIG. 5 is a structural schematic diagram of one optional embodiment of a quantum dot lens provided by one embodiment of the present application.

The lens body 100 has a light incident surface 110 and a light exiting surface 120. As illustrated in FIG. 5, the light exiting surface 120 is defined as a surface where an end of a light exiting side of the lens body 100 is located. The light incident surface 110 is defined as a surface where an end of a light incident side of the lens body 100 is located. A type and a material of the lens body 100 are not limited by the embodiments of the present application, and the type of the lens body 100 is, for example, a reflective lens. The material of the lens body 100 is made of, for example, optical-level polymethyl methacrylate (PMMA, also known as acrylic) or a high transmittance material such as glass. In some embodiments, a shape of the lens body 100 is a plane-symmetry space figure. In some embodiments, the lens body 100 is in a conical-frustum shape.

A groove 121 is defined on the light exiting surface 120. The quantum-dot homogeneous-sol material 200 is filled in the groove 121. The quantum-dot homogeneous-sol material 200 is in a liquid state and includes quantum dots. The quantum dots are semiconductor light emitting nanocrystals, and a particle size of which generally ranges from 1 nm to 20 nm. After being excited by external energy (such as light, electricity), quantum dots of different sizes can emit lights of different colors, and colors of emitted lights can include an entire visible region from blue light to red light. The quantum dots have high luminous color purity, long service life, good stability, and colors can be customized according to requirements. After the quantum dots are excited by light and are converted into high-purity monochromatic light, they are used in panel display technology, which can effectively improve a color gamut of the panel, i.e., color reproduction ability. The quantum dots are, for example, CdSe, InP, perovskite quantum dots, etc. It should be noted that apart from including quantum dots, the quantum-dot homogeneous-sol material 200 can also include other components, such as solvents or other functional components according to specific requirements. In some embodiments, the quantum-dot homogeneous-sol material 200 includes a quantum dot material exciting red light and a quantum dot material exciting green light. An excited light of the red quantum dots and an excited light of the green quantum dots can be mixed to form a yellow light. In some embodiments, a shape of the groove 121 is a plane-symmetric space figure.

In the embodiments of the present application, by filling the quantum-dot homogeneous-sol material 200 in the groove 121 of the lens body 100 to replace an entire quantum dot film generally used in prior art, reduction of luminous efficacy of the quantum dot material incurred by film forming processes can be prevented, thereby improving luminous efficacy and power efficiency of the quantum dot material. Furthermore, taking a 32-inch backlight as an example, a size of the entire quantum dot film used in the prior art needs to be same as a size of the backlight module, i.e., the size of the entire quantum dot film is about 32 inches, and the 32-inch backlight module needs about a dozen of light emitting diode (LED) chips. In the embodiments of the present application, only the groove 121 of the light exiting surface 120 of each lens body 100 needs to be filled with the quantum-dot homogeneous-sol material 200, and in this way, consumption of the quantum dot material can be significantly reduced. Wherein, a manufacturing process of the quantum dot film needs a plurality of processes. For example, by mixing the quantum dots with glue and coating them on a substrate (e.g., polyethylene glycol terephthalate, PET) of a barrier layer, and by bonding two substrates together, and performing curing, winding, cutting and assembling, the embodiments of the present application only need to encapsulate the quantum-dot homogeneous-sol material 200 in the groove 121 of each lens body 100. In this way, the plurality of processes of production and assembly of the entire quantum dot film can be omitted.

In some embodiments of the present application, the lens body 100 has a central axis XX', the groove 121 and the lens body 100 are arranged coaxially, which can also be understood as the groove 121 also having a central axis overlapping the central axis XX' of the lens body 100, and a bottom wall of the groove 121 recesses toward the light incident surface 110 along the central axis XX' of the lens body 100. A depth of the groove 121 decreases radially from the central axis XX' of the lens body 100 to a periphery of the lens body 100. A plane where an opening of the groove 120 is located is perpendicular to the central axis XX'.

In some embodiments of the present application, a central axis of the light source 500 overlaps the central axis XX' of the lens body 100. A light E at a front angle emitted by the light source 500 is allowed to pass through a position where the depth of the groove 121 is at a maximum.

In the embodiments of the present application, by the bottom wall of the groove 121 recessing toward the light incident surface 110 along the central axis XX' of the lens body 100 and by making the depth of the groove 121 decrease radially from the central axis XX' of the lens body 100 to the periphery of the lens body 100, a light path difference (d1–d2) between the light E at the front angle and a light L at a large angle emitted by the light source 500 can be reduced, and the yellow-ring phenomenon can be remedied. Furthermore, by adjusting the shape and a curvature of the bottom wall of the groove 121, a difference in light paths of lights at each angle is allowed to be controlled, e.g., a difference in light paths of the light E at the front angle and the light L at the large angle illustrated in FIG. 5. Therefore, uniformity of colors of emitted light can be further controlled.

Figure 6:
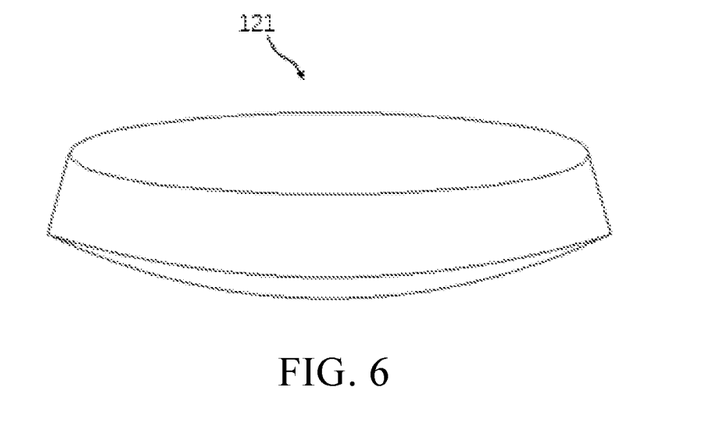
FIG. 6 is a three-dimensional structural schematic diagram of a groove illustrated in FIG. 5.

In some embodiments, as illustrated in FIG. 5 and FIG. 6, the bottom wall of the groove 121 recesses toward a direction facing away from a center O of the light exiting surface 120, i.e., an intersection of the central axis XX' of the lens body 100 and the light exiting surface 120. The curvature of the bottom wall of the groove 121 can be adjusted according to practical requirements.

Figure 7:
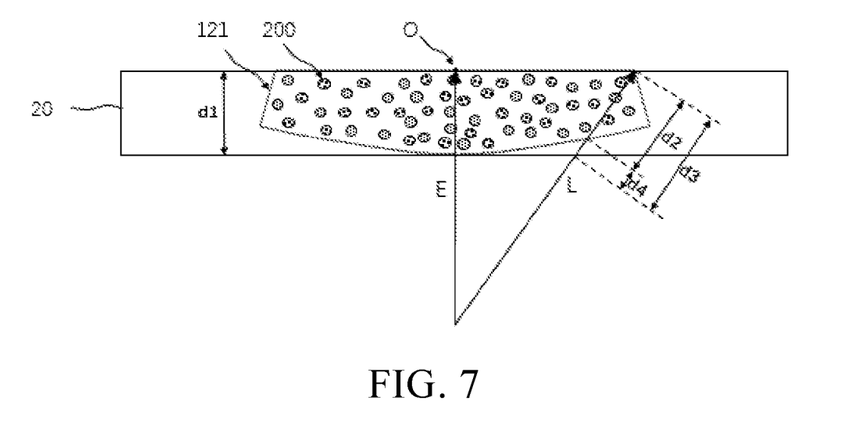
FIG. 7 is a schematic diagram of a principle of remedying the yellow-ring phenomenon by the quantum dot lens illustrated in FIG. 5.

As illustrated in FIG. 7, E in FIG. 7 represents the light at the front angle, L represents the light at the large angle, d1 represents a light path of the light E at the front angle passing through the quantum-dot homogeneous-sol material 200, and d2 represents a light path of the light L at the large angle passing through the quantum-dot homogeneous-sol material 200. Wherein, a thickness of the quantum dot film 20 is equal to the light path of the light E at the front angle passing through the quantum-dot homogeneous-sol material 200. As illustrated in FIG. 7, a light path d3 of the light L at the large angle passing through the quantum dot film 20 is greater than the light path d2 of the light L at the large angle passing through the quantum-dot homogeneous-sol material 200. Therefore, by making the bottom wall of the groove 121 recess toward the light incident surface 110 along the central axis XX' of the lens body 100, for example, the bottom wall of the groove 121 recessing toward the direction facing away from the center O of the light exiting surface 120 as illustrated in FIG. 7, and by making the depth of the groove 121 decrease radially from the central axis XX' of the lens body 100 to the periphery of the lens body 100, the light path of the light L at the large angle is allowed to be reduced. A reduction is about a length d4 illustrated in FIG. 7. Therefore, the difference in the light paths of the light E at the front angle and the light L at the front angle is reduced, which can remedy the yellow-ring phenomenon at a certain extent and can allow the colors of emitted lights more uniform. In addition, the curvature of the groove 121 can also be adjusted to allow the light path of the light of each angle emitted from the light source 500 passing through the quantum-dot homogeneous-sol material 200 to be consistent, so that the colors of the light presented on a backlight film 600 from the light source 500 are allowed to be more uniform.

Figure 8:
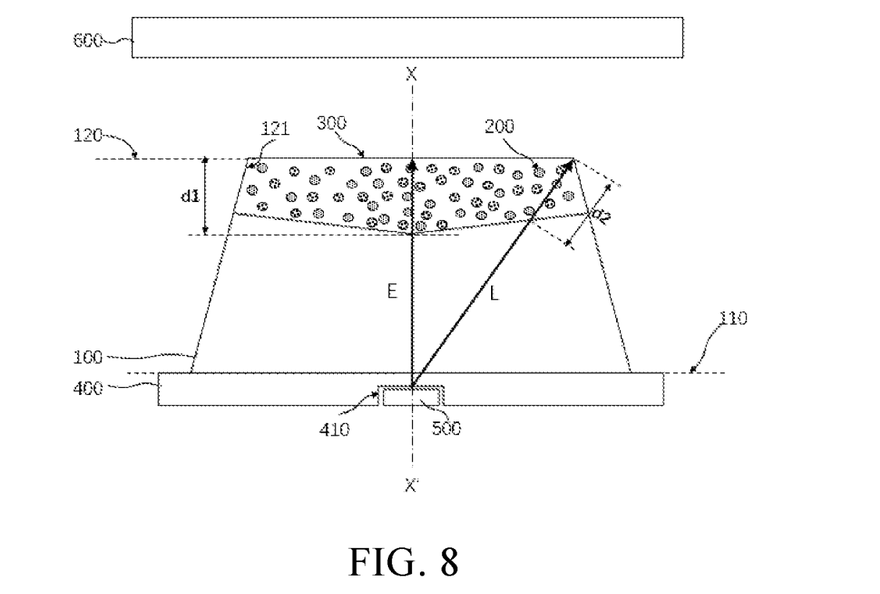
FIG. 8 is a structural schematic diagram of another optional embodiment of the quantum dot lens provided by the present application.
Figure 9:
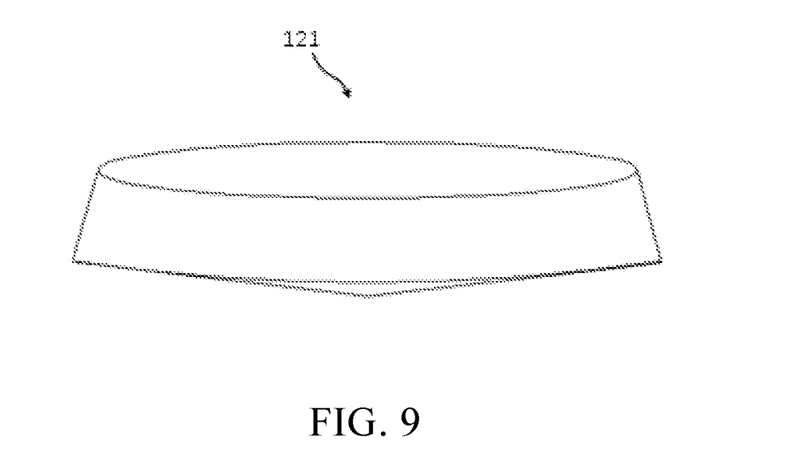
FIG. 9 is a three-dimensional structural schematic diagram of the groove of the quantum dot lens illustrated in FIG. 8.

In some embodiments, as illustrated FIG. 8 and FIG. 9, the bottom wall of the groove 121 is in an inverted conical shape. In other several embodiments, the bottom wall of the groove 121 is in an inverted pyramidal shape. It can be understood that the bottom wall of the groove 121 being in the inverted conical shape or in the inverted pyramidal shape neither protruding toward the center O of the light exiting surface 120 nor recessing toward a direction facing away from the center O of the light exiting surface 120. The inverted pyramidal shape is, for example, an inverted triangular pyramidal shape, an inverted quadrangular pyramidal shape, or an inverted pentagonal pyramidal shape, etc. It can be understood that the principle of remedying the yellow-ring phenomenon in this embodiment is same as the principle of the previous embodiment, and redundant description will not be mentioned herein again. A tilting angle of the bottom wall of the groove 121 can be adjusted according to requirements.

Figure 10:
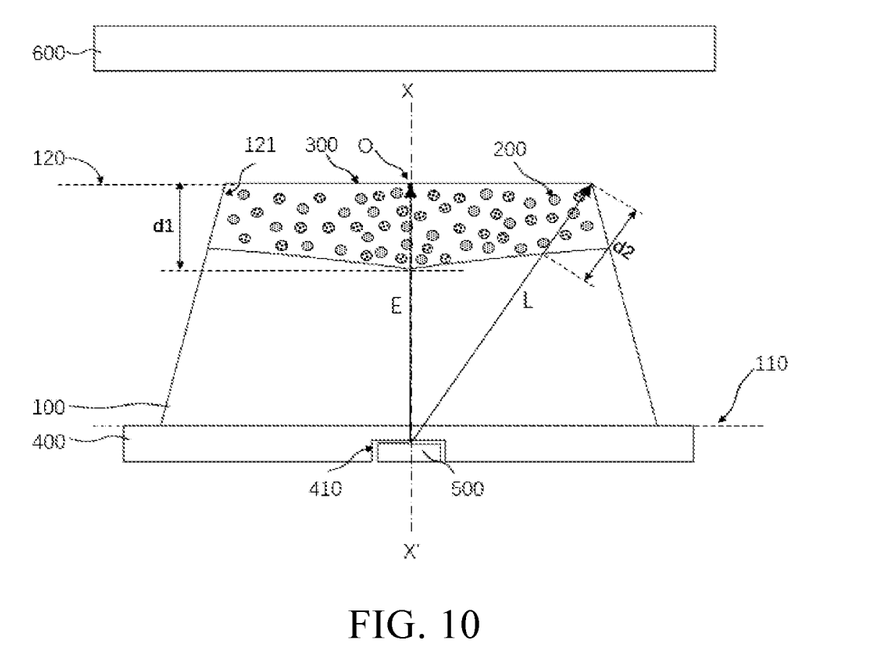
FIG. 10 is a structural schematic diagram of yet another optional embodiment of the quantum dot lens provided by the present application.
Figure 11:
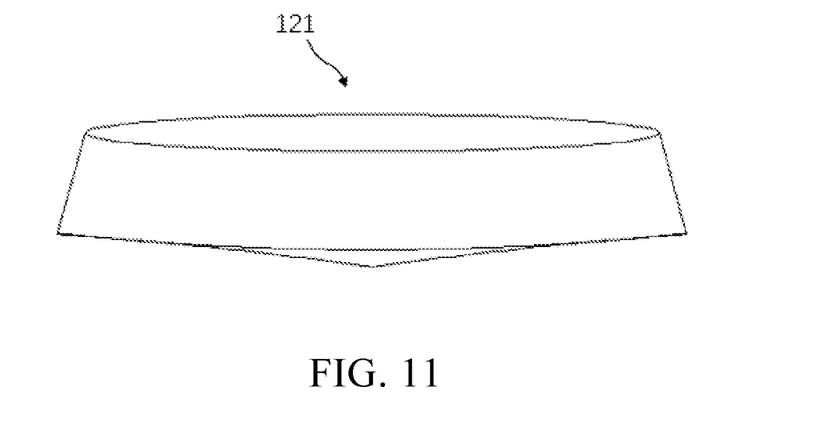
FIG. 11 is a three-dimensional structural schematic diagram of the groove of the quantum dot lens illustrated in FIG. 10.

In some embodiments, as illustrated in FIG. 10 and FIG. 11, the bottom wall of the groove 121 protrudes toward the center O of the light exiting surface 120, i.e., an intersection of the central axis XX' of the lens body 100 and the light exiting surface 120. It can be understood that the principle of remedying the yellow-ring phenomenon in this embodiment is same as the principle of the previous embodiment, and redundant description will not be mentioned herein again. The curvature of the bottom wall of the groove 121 can be adjusted according to requirements.

In some embodiments of the present application, the light source 500 is a Lambertian light source. The light source 500 is, for example, LED chips of a Lambertian shape. The shape and the curvature of the bottom wall of the groove 121 can be adjusted according to characteristics of the Lambertian light source to allow the light path of the light of each angle emitted from the Lambertian light source passing through the quantum-dot homogeneous-sol material 200 to be consistent, so that the colors of the light presented on the backlight film 600 from the Lambertian light source are allowed to be more uniform.

As illustrated in FIG. 5, FIG. 8, and FIG. 10, in some embodiments, the quantum dot lens further includes a cover body 300, and the cover body 300 covers on an opening of the groove 121. In some embodiments, the cover body 300 is planar and is coplanar with the light exiting surface 120. The cover body 300 is configured to isolate external water and oxygen of the groove 121, preventing the quantum dots from contacting water and oxygen and failing, and prolonging service life of the quantum-dot homogeneous-sol material 200.

In some embodiments, the cover body 300 is sealedly connected to the lens body 100, which further enhances effect of isolating external water and oxygen of the groove 121 and further prolongs the service life of the quantum-dot homogeneous-sol material 200.

In other several embodiments, the cover body 300 and the lens body 100 are integrally formed, and a liquid injection opening is defined on the cover body 300. The liquid injection opening is configured to insert the quantum-dot homogeneous-sol material 200 into the groove 121. After the quantum-dot homogeneous-sol material 200 is injected, the liquid injection opening is sealed to isolate external water and oxygen from the groove 121. For example, the cover body 300 and the lens body 100 are integrated in one piece by injection molding, and the liquid injection opening can be defined on the cover body 300 in advance. After the quantum-dot homogeneous-sol material 200 is injected, the liquid injection opening is sealed by methods such as a glue dispensing method or a heat melting method, etc.

In some embodiments of the present application, an interior of the groove 121 is in a vacuum state. The vacuum state can be realized by vacuuming the interior of the groove 121. Using a vacuum environment not only can effectively isolate the external water and oxygen from the groove 121, but also can prevent presence of water and oxygen in the groove 121 from affecting performance of the quantum-dot homogeneous-sol material 200, which effectively prevents failure of the quantum dots and further prolongs the service life of the quantum-dot homogeneous-sol material 200.

As illustrated in FIG. 5, FIG. 8, and FIG. 10, in some embodiments, the quantum dot lens further includes a base 400, and a cavity 410 which is able to accommodate the light source 500 and which is defined on the base 400. In some embodiments of the present application, a central axis of the cavity 410 overlaps the central axis XX' of the lens body 100. In this way, the light source 500 can be disposed at the center of the cavity 410, which is conducive to allowing the central axis of the light source 500 to align with and to overlap the central axis XX' of the lens body 100, thereby allowing the light at the large angle emitted from the light source 500 to pass through the position where the depth of the groove 121 is maximum.

One embodiment of the present application further provides a backlight module. The backlight module includes at least one of any aforesaid quantum dot lens and at least one light source 500. Wherein, each of the light source 500 is provided with the at least one quantum dot lens, and the light incident surface 110 of the quantum dot lens faces toward the light source 500. The light source 500 is, for example, LED chips.

In the embodiments mentioned above, the descriptions to the various embodiments are emphasized, and the part is not described in detailed in an embodiment, can refer to the detailed description of other embodiments mentioned above.

In summary, compared to entire quantum dot films generally used in the prior art, in embodiments of the present application, the quantum-dot homogeneous-sol material 200 is filled in the groove 121 of the light exiting surface 120 of the lens body 100, which allows luminous efficacy and power efficiency of the quantum dot material to be improved, and reduction of luminous efficacy of the quantum dot material incurred by film forming processes is prevented. Furthermore, consumption of the quantum dot material can be reduced, eliminating production and assembling processes of the quantum dot films. In addition, by controlling the shape of the bottom wall of the groove 121, the depth of the groove 121 decreases radially from the central axis XX' of the lens body 100 to the periphery of the lens body 100 which allows the difference in the light paths of the light E at front viewing angles and the light L at large angles, thereby alleviating the problem of uneven color of emitted light incurred by the yellow-ring phenomenon.

The quantum dot lens and the backlight module provided by the embodiments of the present application are described in detail. This article uses specific cases for describing the principles and the embodiments of the present application, and the description of the embodiments mentioned above is only for helping to understand the method and the core idea of the present application. Meanwhile, for those skilled in the art, will have various changes in specific embodiments and application scopes according to the idea of the present application. In summary, the content of the specification should not be understood as limit to the present application.

What is claimed is:

1. A quantum dot lens used for light distribution for a light source, comprising:
   a lens body having a light incident surface and a light exiting surface, wherein the light exiting surface has a groove; and
   a quantum-dot homogeneous-sol material filled in the groove;
   wherein the lens body has a central axis, the groove and the lens body are arranged coaxially, a bottom wall of the groove recesses toward the light incident surface along the central axis of the lens body, a depth of the groove decreases radially from the central axis of the lens body to a periphery of the lens body, and the light source is a Lambertian light source.

2. The quantum dot lens as claimed in claim 1, wherein the bottom wall of the groove recesses toward a direction facing away from a center of the light exiting surface; or
   the bottom wall of the groove protrudes toward the center of the light exiting surface; or
   the bottom wall of the groove is in an inverted conical shape or in an inverted pyramidal shape; or
   a groove wall of the groove comprises a curving surface.

3. The quantum dot lens as claimed in claim 1, wherein a plane where an opening of the groove is located is perpendicular to the central axis of the lens body.

4. The quantum dot lens as claimed in claim 1, wherein the lens body is in a conical-frustum shape, an area of the light exiting surface is greater than an area of the light exiting surface.

5. The quantum dot lens as claimed in claim 1, wherein a central axis of the light source overlaps the central axis of the lens body.

6. The quantum dot lens as claimed in claim 1, wherein the light source is a light emitting diode (LED) chip.

7. The quantum dot lens as claimed in claim 1, wherein the quantum dot lens further includes a cover body, and the cover body covers on an opening of the groove.

8. The quantum dot lens as claimed in claim 7, wherein the cover body is sealedly connected to the lens body.

9. The quantum dot lens as claimed in claim 7, wherein an interior of the groove is in a vacuum state.

10. A backlight module, comprising at least one quantum dot lens as claimed in claim 1 and at least one light source, wherein each of the light source is provided with one quantum dot lens, and the light incident surface of the quantum dot lens faces the light source.

11. A quantum dot lens used for light distribution for a light source, comprising:
    a lens body having a light incident surface and a light exiting surface, wherein the light exiting surface has a groove; and
    a quantum-dot homogeneous-sol material filled in the groove.

12. The quantum dot lens as claimed in claim 11, wherein the lens body has a central axis, the groove and the lens body are arranged coaxially, a bottom wall of the groove recesses toward the light incident surface along the central axis of the lens body, a depth of the groove decreases radially from the central axis of the lens body to a periphery of the lens body.

13. The quantum dot lens as claimed in claim 12, wherein the bottom wall of the groove recesses toward a direction facing away from a center of the light exiting surface; or
    the bottom wall of the groove protrudes toward the center of the light exiting surface; or
    the bottom wall of the groove is in an inverted conical shape or in an inverted pyramidal shape;
    a groove wall of the groove comprises a curving surface.

14. The quantum dot lens as claimed in claim 12, wherein a plane where an opening of the groove is located is perpendicular to the central axis of the lens body.

15. The quantum dot lens as claimed in claim 11, wherein the lens body is in a conical-frustum shape, an area of the light exiting surface is greater than an area of the light exiting surface.

16. The quantum dot lens as claimed in claim 11, wherein a central axis of the light source overlaps a central axis of the lens body.

17. The quantum dot lens as claimed in claim 11, wherein the light source is a Lambertian light source.

18. The quantum dot lens as claimed in claim 11, wherein the quantum dot lens further includes a cover body, and the cover body covers on an opening of the groove.

19. The quantum dot lens as claimed in claim 18, wherein the cover body is sealedly connected to the lens body.

20. The quantum dot lens as claimed in claim 18, wherein an interior of the groove is in a vacuum state.

* * * * *